United States Patent
Von Broembsen

(10) Patent No.: US 6,821,398 B2
(45) Date of Patent: Nov. 23, 2004

(54) CHLORINATION SYSTEM FOR SWIMMING POOLS AND THE LIKE

(75) Inventor: David Von Broembsen, Roswell, GA (US)

(73) Assignee: Chlorking, Inc., Norcross, GA (US)

( * ) Notice: Subject to any disclaimer, the term of this patent is extended or adjusted under 35 U.S.C. 154(b) by 281 days.

(21) Appl. No.: 10/173,359

(22) Filed: Jun. 17, 2002

(65) Prior Publication Data

US 2003/0024809 A1 Feb. 6, 2003

Related U.S. Application Data

(63) Continuation-in-part of application No. 09/592,719, filed on Jun. 13, 2000, now abandoned.
(60) Provisional application No. 60/148,452, filed on Aug. 12, 1999, and provisional application No. 60/145,537, filed on Jul. 26, 1999.

(51) Int. Cl.[7] ............................. C25B 9/00; C25B 11/00
(52) U.S. Cl. ................. 204/278.5; 204/269; 204/275.1; 204/280
(58) Field of Search .................... 204/278.5, 269, 204/275.1, 280

(56) References Cited

U.S. PATENT DOCUMENTS

| | | | | |
|---|---|---|---|---|
| 820,113 | A | * 5/1906 | Hinkson | 204/268 |
| 3,792,979 | A | 2/1974 | Clinton | 23/267 A |
| 4,173,525 | A | * 11/1979 | Nakamatsu et al. | 204/278.5 |
| 4,392,937 | A | * 7/1983 | Schmitt et al. | 204/269 |
| 4,869,016 | A | 9/1989 | Diprose et al. | 43/124 |
| 5,460,706 | A | 10/1995 | Lisboa | 204/269 |
| 5,468,360 | A | 11/1995 | David et al. | 204/228 |
| 6,391,167 | B1 | * 5/2002 | Grannersberger | 204/228.3 |

* cited by examiner

Primary Examiner—Patrick Ryan
Assistant Examiner—Thomas H. Parsons
(74) Attorney, Agent, or Firm—Barry E. Kaplan, Esq.; Myers & Kaplan, LLC

(57) ABSTRACT

An improved chlorination system for pools, spas, potable water supplies, and the like, provides a vertically oriented electrolytic cell connected between a pump and a lightly salinated pool. The cell preferably contains a metallic electrode, such as copper, and a precious metal coated titanium electrode, and has means for passing an electric current through the cell. The present invention further provides a novel electrode stack design, conducive for forming an efficient chlorinator comprising a plurality of interconnecting electrode stacks of separate electrical cells.

20 Claims, 11 Drawing Sheets

CHLORINATION SYSTEM FOR SWIMMING POOLS AND THE LIKE

CROSS-REFERENCE TO RELATED APPLICATIONS

The inventor hereof claims priority based upon and pursuant to U.S. provisional patent application Ser. No. 60/145,537 filed Jul. 26, 1999, U.S. provisional patent application Ser. No. 60/148,452 filed Aug. 12, 1999, and is a continuation in part of U.S. non-provisional patent application Ser. No. 09/592,719 filed Jun. 13, 2000, now abandoned.

BACKGROUND OF THE INVENTION

1. Technical Field

The present invention relates to systems for the electrolytic chlorination of bodies of water; and, more particularly, to such a system whereby a vertically oriented electrolytic cell containing a metallic electrode, such as copper, and a precious metal coated titanium electrode is connected between a pump and a body of water, such as a pool, spa, supply of potable water, or the like, containing a saline solution, and having means for passing an electric current through the cell. The present invention further provides a novel electrode stack design, conducive for forming an efficient chlorinator comprising a plurality of interconnecting electrode stacks of separate electrical cells.

2. Description of Related Art

As is well known, swimming pools, spas, and the like, must be chlorinated to prevent accumulation of algae and bacteria, transfer of disease, and the like. Heretofore, such chlorination has been accomplished by depositing relatively large quantities of sodium hypochlorite into the water to be gradually dissolved over time. Unfortunately, with this procedure, the high quantities of chlorine released immediately after the sodium hypochlorite has been added to the water gives off a strong and offensive odor that makes swimming unpleasant. Also, the high concentration of chlorine results in bleaching bathing suits, towels, and the like. Further, a high concentration of chlorine often results in eye and skin irritation, and may even discolor the swimmers' hair. Obviously, none of these effects is desirable.

On the other hand, between treatments, the chlorine level often falls below a biologically effective level, which allows buildup of bacteria and algae, and allows transfer of disease. This, too, is undesirable. Thus, the chlorine treatments systems of the prior art have not been entirely satisfactory.

Various attempts have been made to provide systems for improving the effective treatment of such bodies of water. Such systems may comprise electrolytic cells for dissociation of a salt to yield a bioactive agent, or may provide for periodic infusion into a body of water of chlorine, provided, for example, by a floating reserve of chlorine tablets. Examples of such systems may be seen with reference to British Patent Number 1,426,017 to Miles; U.S. Pat. No. 3,792,979 to Clinton; U.S. Pat. No. 4,869,016 to Diprose et al.; U.S. Pat. No. 5,460,706 to Lisboa; and, U.S. Pat. No. 5,468,360 to David et al.

None of these systems, however, are seen to provide the several benefits, features, and advantages of the present invention. Further, none are seen to provide an electrode stack design that is conducive for forming an efficient electrolytic cell comprising a plurality of independent, but electrically interconnected, electrode stacks forming adjacent cells within the common housing of a single chlorinator. Through use of such a chlorinator, better control of bioactive chlorination within a body of water may be maintained.

BRIEF SUMMARY OF THE INVENTION

These disadvantages of the prior art are overcome with the present invention, and an improved method of chlorinating swimming pools, spas, potable water supplies, and the like, is provided which constantly maintains the water at a desired level of chlorination without significant variation and which prevents fading of clothing, discoloration of hair, irritation of skin and eyes, and other disagreeable and dangerous side effects, while discouraging growth of bacteria and algae, and ensuring that the water will be safe for bathers.

These advantages of the present invention are preferably attained by providing an improved chlorination system for pools, spas, potable water supplies, and the like, comprising means for maintaining an approximate 0.7% saline solution in said body of water and providing a vertically-oriented electrolytic cell connected between the pump and the body of water. The electrolytic cell contains a metallic electrode, such as copper, and a precious metal coated titanium electrode, and has means for passing an electric current through the cell.

The present invention further provides a novel electrode stack design, conducive for forming an efficient electrolytic cell comprising a plurality of interconnecting electrode stacks. Accordingly, provided is an electrode having a tab adjacent its top for electrical interconnection with other like-charged electrodes, and for offsetting oppositely charged, but similarly interconnected, electrodes in a staggered manner. Non-conductive spacer elements are provided between electrodes, and, further, between electrode stacks, to prevent current leakage and shorting therebetween. A plurality of electrically interconnected electrode stacks within a common housing form a plurality of independent, but electrically interconnected cells, within a single chlorinator. Electrical connection of this plurality of cells in series provides a highly efficient, low current, high yield chlorinator previously unknown in the art.

Accordingly, it is an object of the present invention to provide an improved chlorination system for pools, spas, potable water supplies, and the like.

Another object of the present invention is to provide an improved chlorination system for pools, spas, potable water supplies, and the like, which constantly maintains the water at a desired level of chlorination without significant variation.

Still another object of the present invention is to provide an improved chlorination system for pools, spas, potable water supplies, and the like, which prevents fading of clothing.

Yet another object of the present invention is to provide an improved chlorination system for pools, spas, potable water supplies, and the like, which prevents discoloration of hair.

Yet still another object of the present invention is to provide an improved chlorination system for pools, spas, potable water supplies, and the like, which prevents irritation of skin and eyes and other disagreeable and dangerous side effects.

A further object of the present invention is to provide an improved chlorination system for pools, spas, and the like, which prevents disagreeable side effects while discouraging growth of bacteria and algae, and ensuring that the water will be safe for its intended use.

Still a further object of the present invention is to provide an improved chlorination system for pools, spas, and the like, comprising means for maintaining a 0.7% saline solution in said pool and providing an electrolytic cell connected between the pump and the pool, and containing a metallic electrode, such as copper, and a precious metal coated titanium electrode, and having means for passing an electric current through said cell.

Yet still a further object of the present invention is to provide an improved chlorination system for pools, spas, and the like, comprising a novel electrode stack design, conducive for forming an efficient electrolytic cell comprising a plurality of interconnecting electrode stacks.

Yet still another object of the present invention is to provide an improved chlorination system for pools, spas, and the like, wherein the chlorinator comprises an electrode having a tab adjacent its top for electrical interconnection with other like-charged electrodes, and for offsetting oppositely charged, but similarly interconnected, electrodes in a staggered manner.

Yet still another and further object of the present invention is to provide an improved chlorination system for pools, spas, and the like, wherein the chlorinator further comprises non-conductive spacer elements provided between electrodes, and, further, between electrode stacks, to prevent current leakage and shorting therebetween.

Still a further object of the present invention is to provide an improved chlorination system for pools, spas, and the like, wherein the chlorinator comprises a plurality of electrically interconnected electrode stacks within a common housing to form a plurality of independent, but electrically interconnected cells, within a single chlorinator, and wherein electrical connection of this plurality of cells in series provides a highly efficient, low current, high yield chlorinator.

These and other objects, features, and advantages of the invention will become more apparent to those ordinarily skilled in the art after reading the following Detailed Description and claims in light of the accompanying drawing Figures.

BRIEF DESCRIPTION OF THE DRAWINGS

Accordingly, the present invention will be understood best through consideration of, and reference to, the following Figures, viewed in conjunction with the Detailed Description of the Preferred Embodiment referring thereto, in which like reference numbers throughout the various Figures designate like structure and in which.

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION OF THE INVENTION

In describing preferred embodiments of the present invention illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose.

Figure 1:
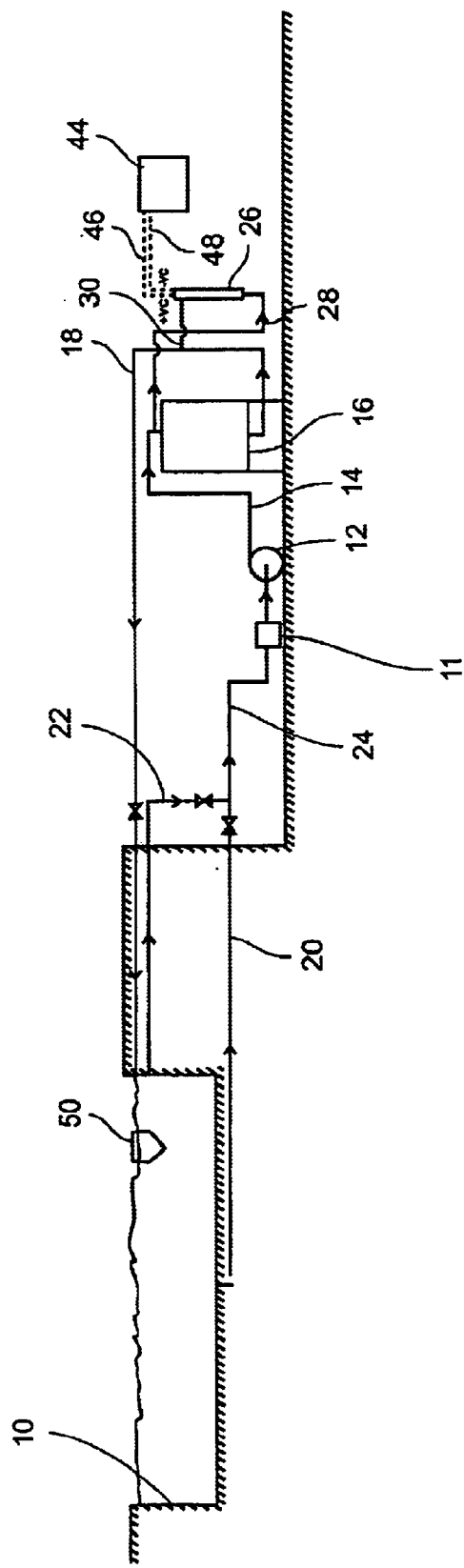
FIG. 1 is a diagrammatic representation of a pool chlorination system embodying the present invention.

In that form of the present invention chosen for purposes of illustration, FIG. 1 shows a swimming pool 10 having strainer 11 and pump 12, strainer 11 being provided advance of pump 12 to reduce introduction of floating debris into pump 12. Pump 12 acts to deliver water through pipe 14, filter 16, delivery pipe 18, filter inlet pipes 20, 22 and 24 to circulate water through pool 10. In accordance with the present invention, chlorinator 26 is connected by inlet pipe 28 and return pipe 30 to cause water from pipe 14 to pass through chlorinator 26 for chlorination and be inserted into delivery pipe 18 to deliver the chlorine into pool 10.

Figure 2:
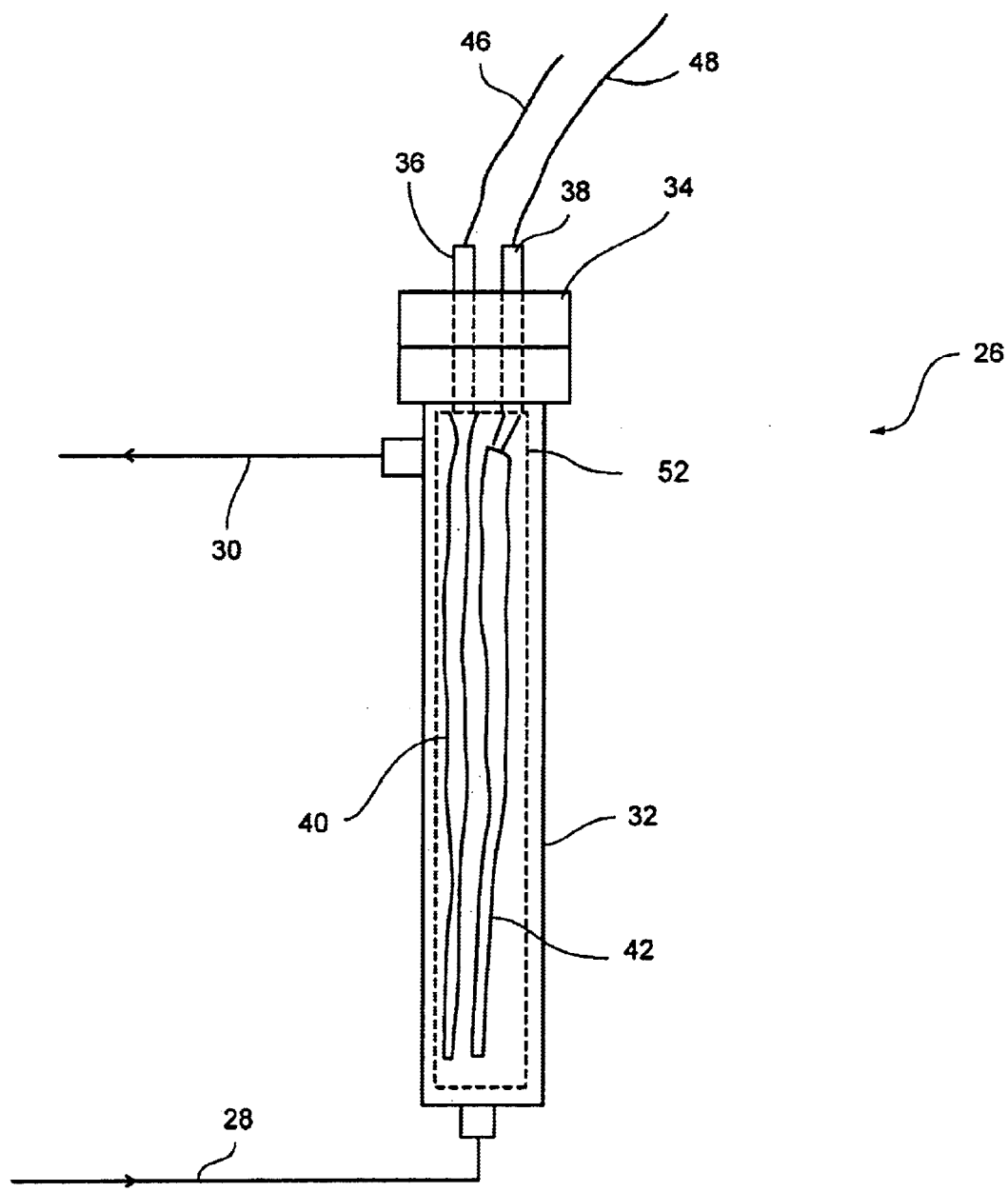
FIG. 2 is a vertical section through an electrolytic cell of the chlorination system of FIG. 1 showing a single electrode of each polarity.

As best seen in FIG. 2, chlorinator 26 is a hollow cylindrical member, preferably vertically-oriented, having cell stack containment housing 32 formed of electrically insulating material, such as clear polyvinyl chloride (hereinafter, "PVC") tubing. Flanged union 34, or other suitable removable cap, preferably of PVC, is provided atop housing 32, through which are mounted a pair of current header connecting rod conductors 36, 38 which connect to electrodes 40, 42, respectively.

Direct current power supply 44 is connected by wires 46, 48 to current header connecting rod conductors 36, 38 in order to cause a low voltage (less than 12 volts) direct current to flow between electrodes 40, 42. Metallic electrode 40 preferably is formed of copper and, in normal operation, is connected to the negative pole of power supply 44, while electrode 42 preferably is formed of titanium and is coated with a precious metal, such as a platinum group metal or combination of platinum group metals, and, in normal operation, is connected to the positive pole of power supply 44. It will be recognized by those ordinarily skilled in the art that the just-described normal operating polarity may be reversed in order to provide touch-free cleaning of electrodes 40, 42.

Turning again to FIG. 1, suitable means 50, such as a porous float, feeder mechanism, dispenser, or the like, optionally are provided for adding water softener grade granular salt directly to pool 10 in order to enhance the electrical conductivity of the water. This is typically done by adding 40 pound bags of salt which dissolve into the water of the pool to maintain the salinity of the pool at approximately a 0.07% level, which is approximately equal to the salinity of human tears and, hence, will not cause irritation or discomfort to swimmers' eyes. Any salt concentration which is lost in the pool as by backwashing the filter, pool leaks, or dilution can be replaced by adding appropriate amounts of salt directly to the pool water.

While FIG. 2 shows, for convenience of understanding, only a single electrode of each respective material and polarity, it will be recognized with reference to FIGS. 2A–2E and FIG. 3, along with the following discussion thereof, that a plurality of electrodes 40, 42 are provided for forming, in combination, one or more electrode stacks 52. Within each electrode stack 52, each electrode 40 is electrically connected in parallel with other electrodes 40. Similarly, within each electrode stack 52, each electrode 42 is electrically connected in parallel with other electrodes 42.

Figure 3:
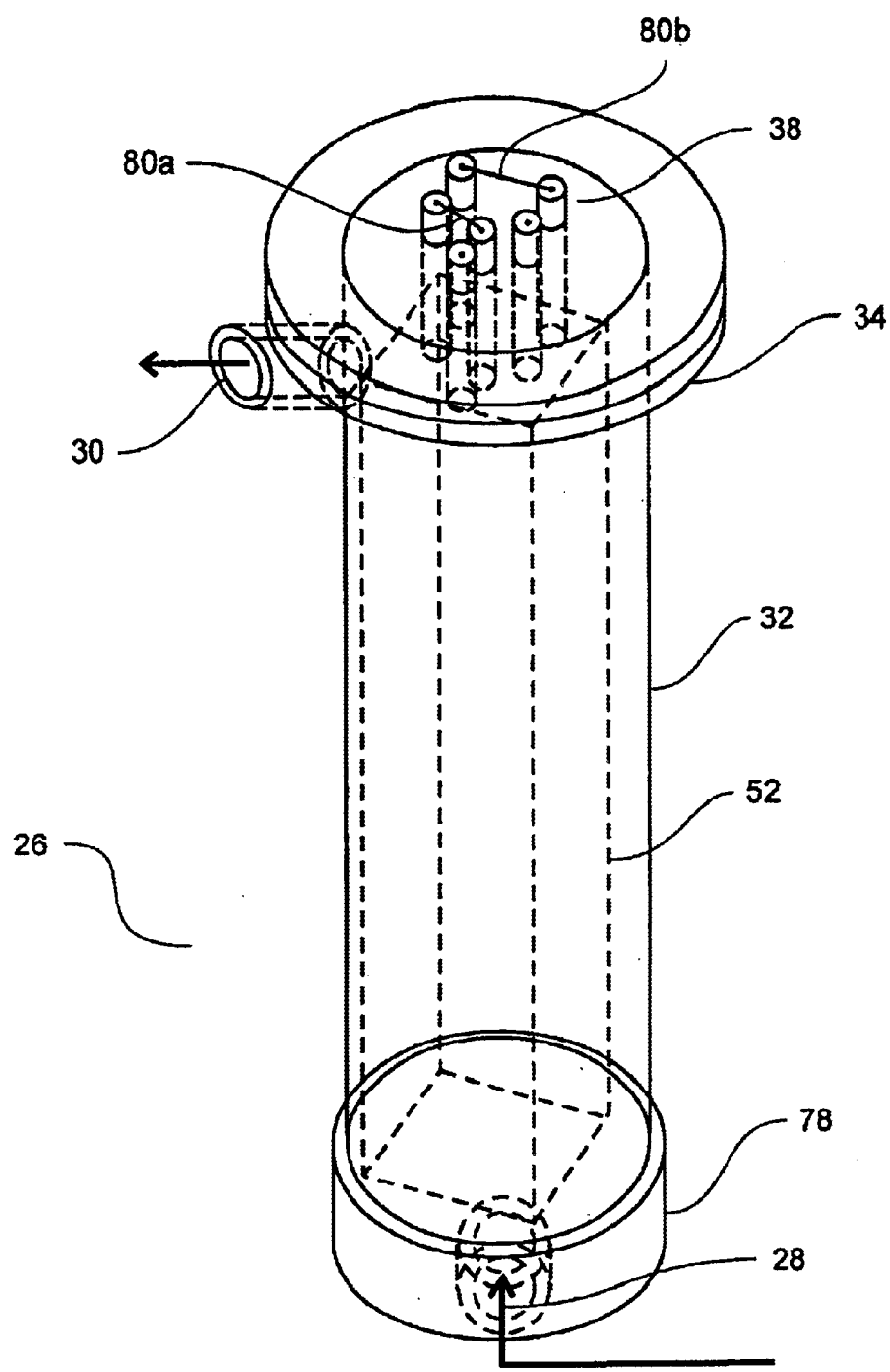

Accordingly, each electrode stack 52 forms an operable electrolytic cell within chlorinator 26. Each electrode stack 52 is insulated from other electrode stacks by nonconducting spacer 54, preferably formed of non-conducting plastic. As best seen in FIG. 3, each electrode stack 52 is electrically connected in series with other electrode stacks 52.

Accordingly, FIGS. 2A–2H and FIG. 3 have been chosen to illustrate the preferred construction of chlorinator 26, and, especially, the preferred construction of electrode stack 52. Advantageous to the vertical construction and orientation of chlorinator 26, in combination with the above-described flanged union 34, electrode stack 52 is easily removable from clear containment housing 32. Such construction aids operator viewing of the condition of the elements internal to chlorinator 26, and is convenient to maintenance operations.

Figure 2A:
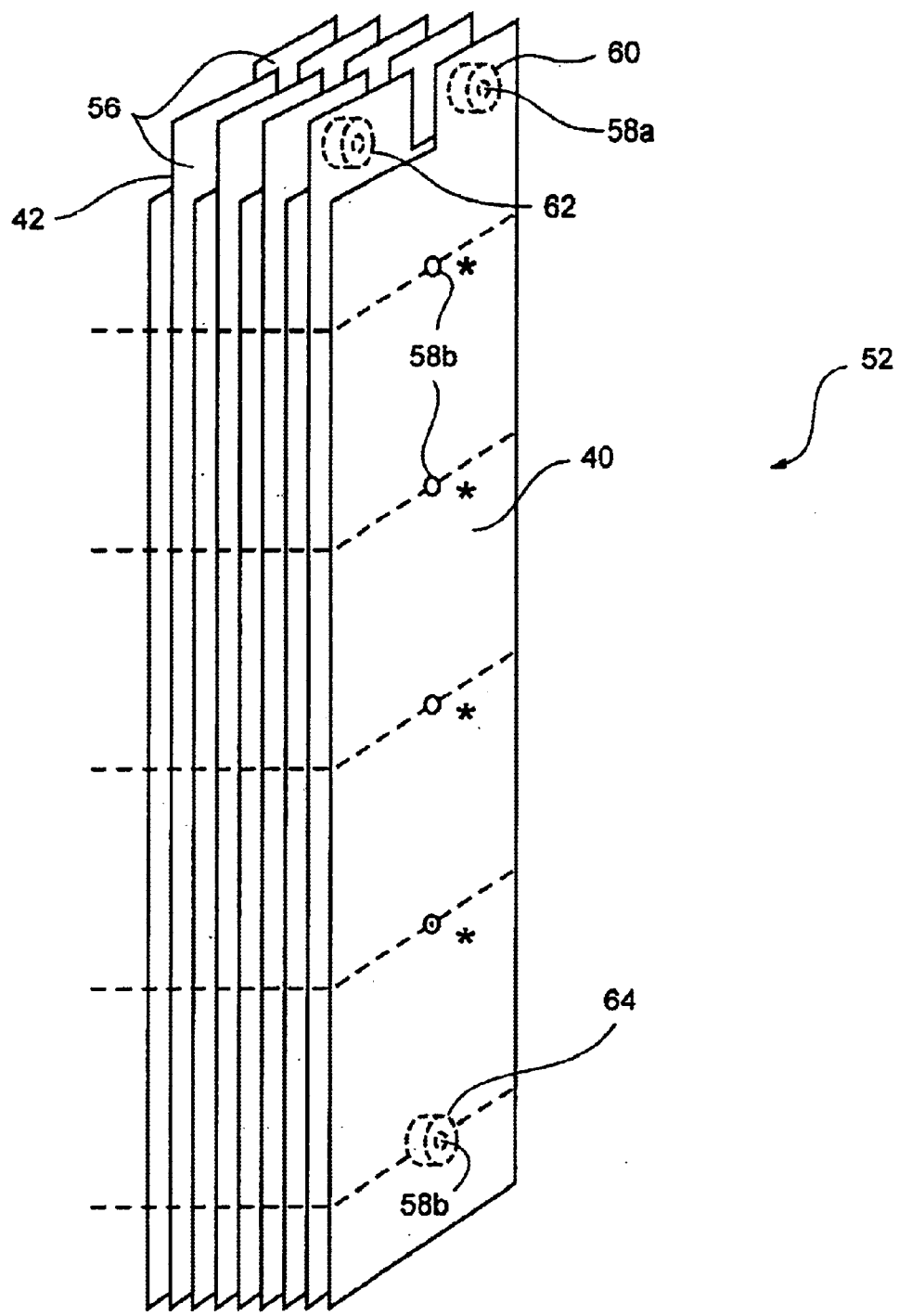
FIG. 2A is a perspective elevation view of a single-cell electrode stack in accordance with the chlorination system of FIG. 1.

Turning now to the details of preferred construction of chlorinator 26, FIG. 2A illustrates a single-cell electrode stack 52 of the present invention. A plurality of metallic plate electrodes 40, preferably of copper, are alternately interspersed with a plurality of precious metal coated titanium plate electrodes 42. Current connector tabs 56 preferably are formed integrally with electrodes 40, 42 adjacent the top thereof. Connecting hole 58a is provided within each tab 56. Additional connecting holes 58b are provided within each electrode 40, 42 for purposes described more fully hereinbelow.

A plurality of metallic spacers 60 are disposed between current connector tabs 56 of electrodes 40 at connecting holes 58a so as to electrically connect electrodes 40, while bridging and separating electrodes 40 from oppositely charged electrodes 42. Similarly, a plurality of titanium spacers 62 are disposed between current connector tabs 56 of electrodes 42 at connecting holes 58a so as to electrically connect electrodes 42, while bridging and separating electrodes 42 from oppositely charged electrodes 40. A plurality non-conducting spacers 64 are disposed between each electrode 40, 42 at additional connecting holes 58b within each electrode 40, 42 in order to provide electrode stack 52 with sufficient structural rigidity for operation and handling of stack 52, while maintaining electrical separation of each electrodes 40, 42.

Figure 2B:
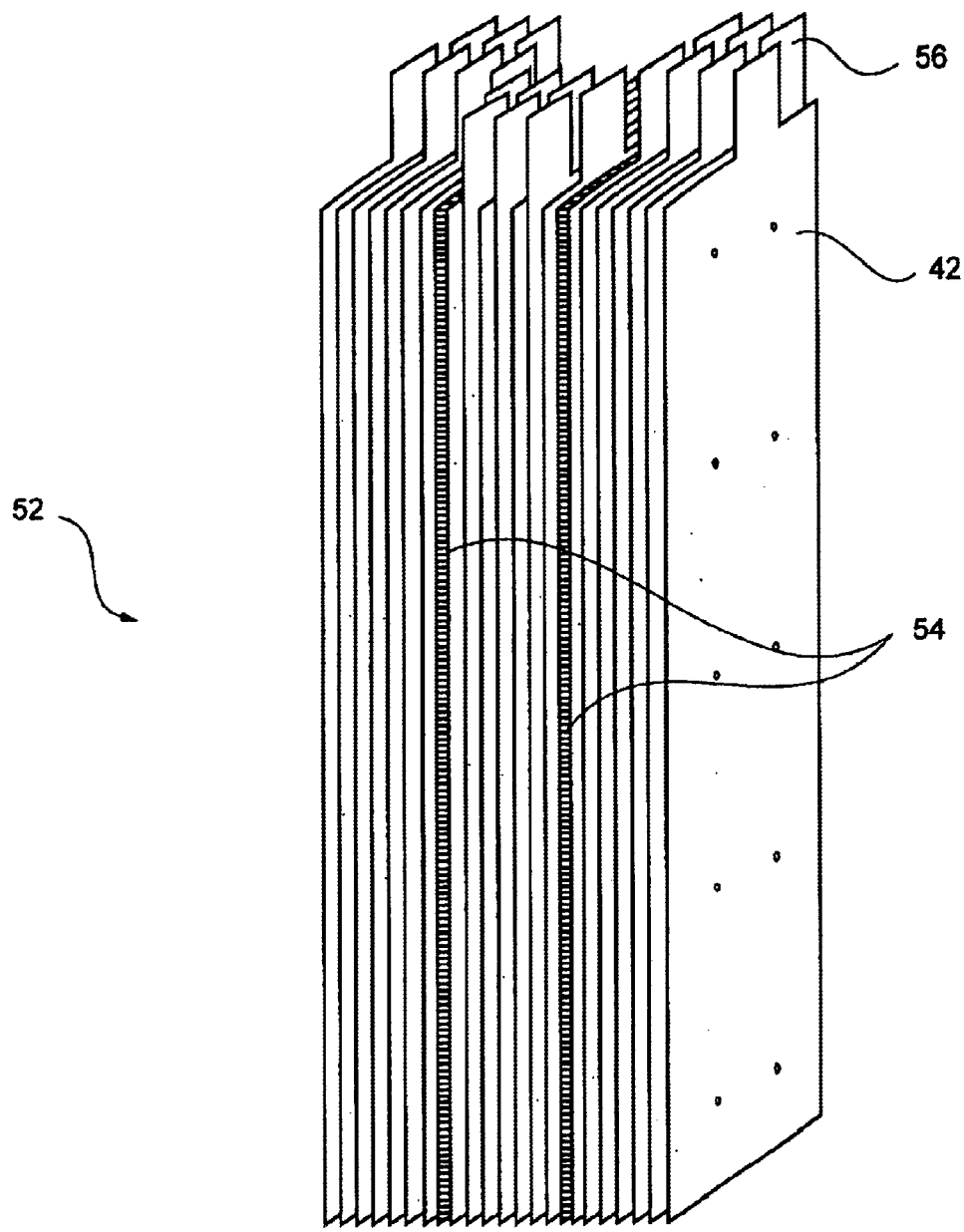
FIG. 2B is a perspective elevation view of a three-cell electrode stack in accordance with the chlorination system of FIG. 1.

Turning next to FIG. 2B, a three-cell electrode stack 52 in accordance with the present invention is shown. Each cell is constructed substantially as described with reference to FIG. 2A; and, further, non-conducting spacer 54 separates each cell to prevent channeling of current between adjacent cells. As can be seen in this FIG. 2B, and specifically advantageous to the present invention, current connector tabs 56 may be formed and disposed within each stack 52 so as to maintain appropriate electrical connectivity, while alternating in horizontal placement relative to each other stack 52, similar to conventional paper file folder tabs. Such arrangement provides the ability to design an optimal number of electrodes 40, 42 forming an optimal number of separate stacks 52, and resulting in a large number of adjacent, insulated, and separate, but electrically interconnected, electrolytic cells within a given size of containment housing 32.

Figure 2C:
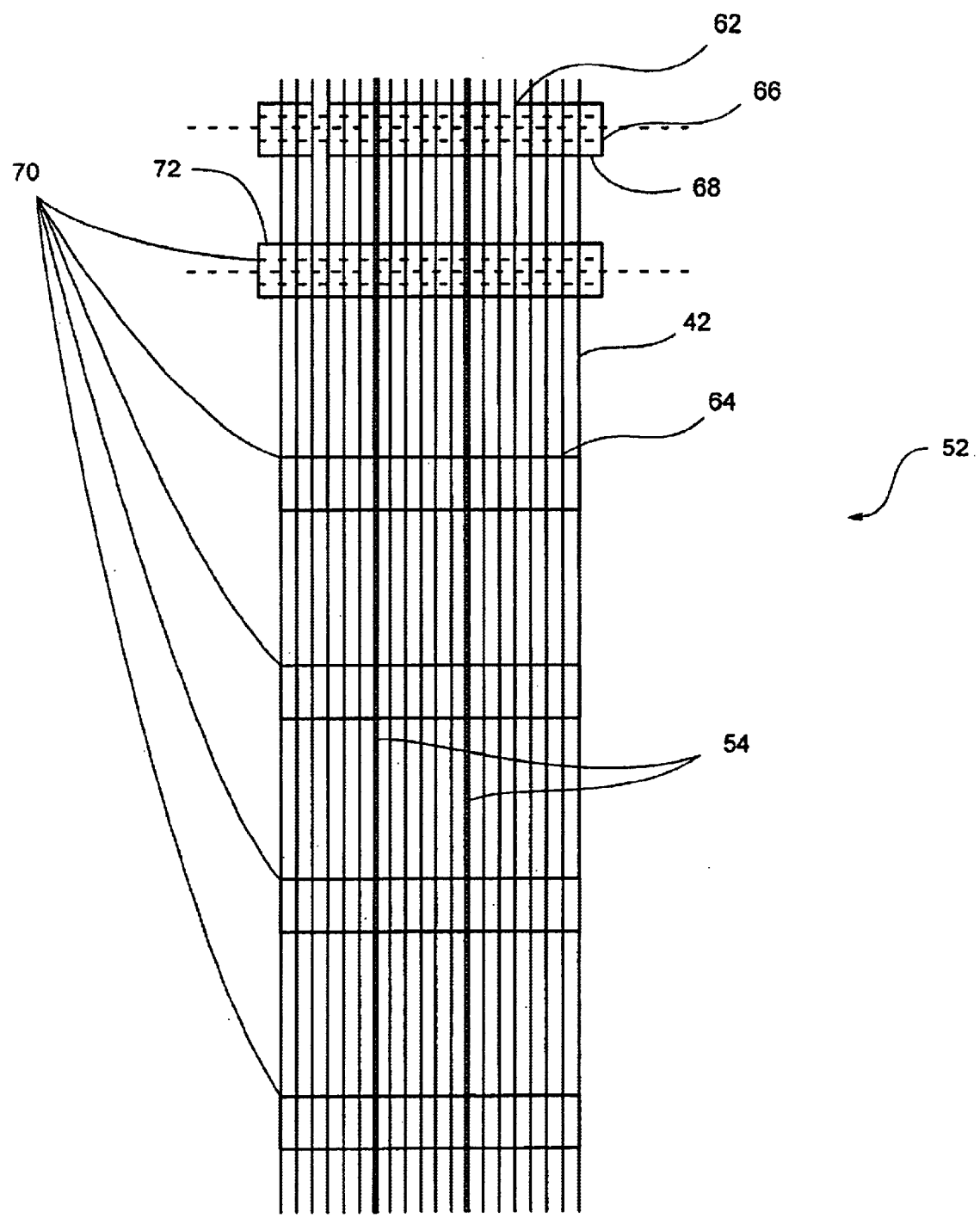
FIG. 2C is a side elevation view of a three-cell electrode stack in accordance with the chlorination system of FIG. 1.

FIG. 2C illustrates further details of construction of a three-cell electrode stack 52 of the present invention. Titanium threaded rod 66 is carried within connecting holes 58a of tabs 56 of electrodes 42. Titanium threaded rod 66 further carries titanium spacers 62, and titanium nuts 68 are provided to assemble this portion of electrode stack 52. Similar construction is made with regard to electrodes 40; however, it will be recognized that metallic threaded rod, spacer, and nut components are selected for compatibility of use and operation with electrodes 40.

It will be further apparent that, in order to provide electrode stack 52 with sufficient structural rigidity for operation and handling of stack 52, while maintaining electrical separation of each electrode 40, 42, a plurality of non-conducting spacers 64, preferably of PVC material, are disposed between each electrode 40, 42 at additional connecting holes 58b within each electrode 40, 42. Spacers 64 are carried by non-conducting threaded rods 70 and are joined together with non-conductive nuts 72, both preferably of PVC material. Such an arrangement, in association with herein-described conductive elements, provides for desirable continuity of contact between electrode plates of like charge, while providing for desirable separation of electrode plates of unlike charge.

Figure 2D:
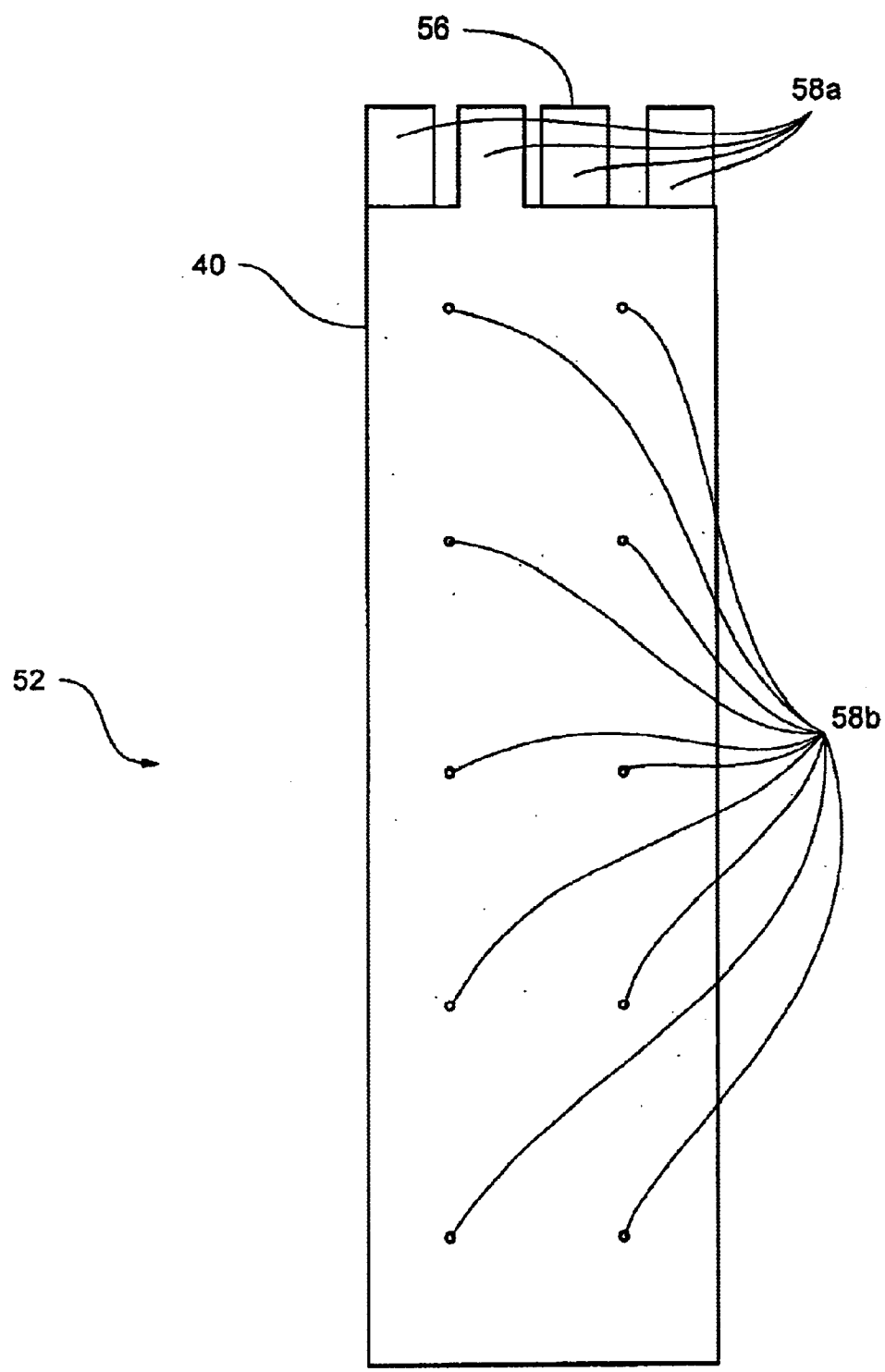
FIG. 2D is a front elevation view of a three-cell electrode stack in accordance with the chlorination system of FIG. 1.
Figure 2E:
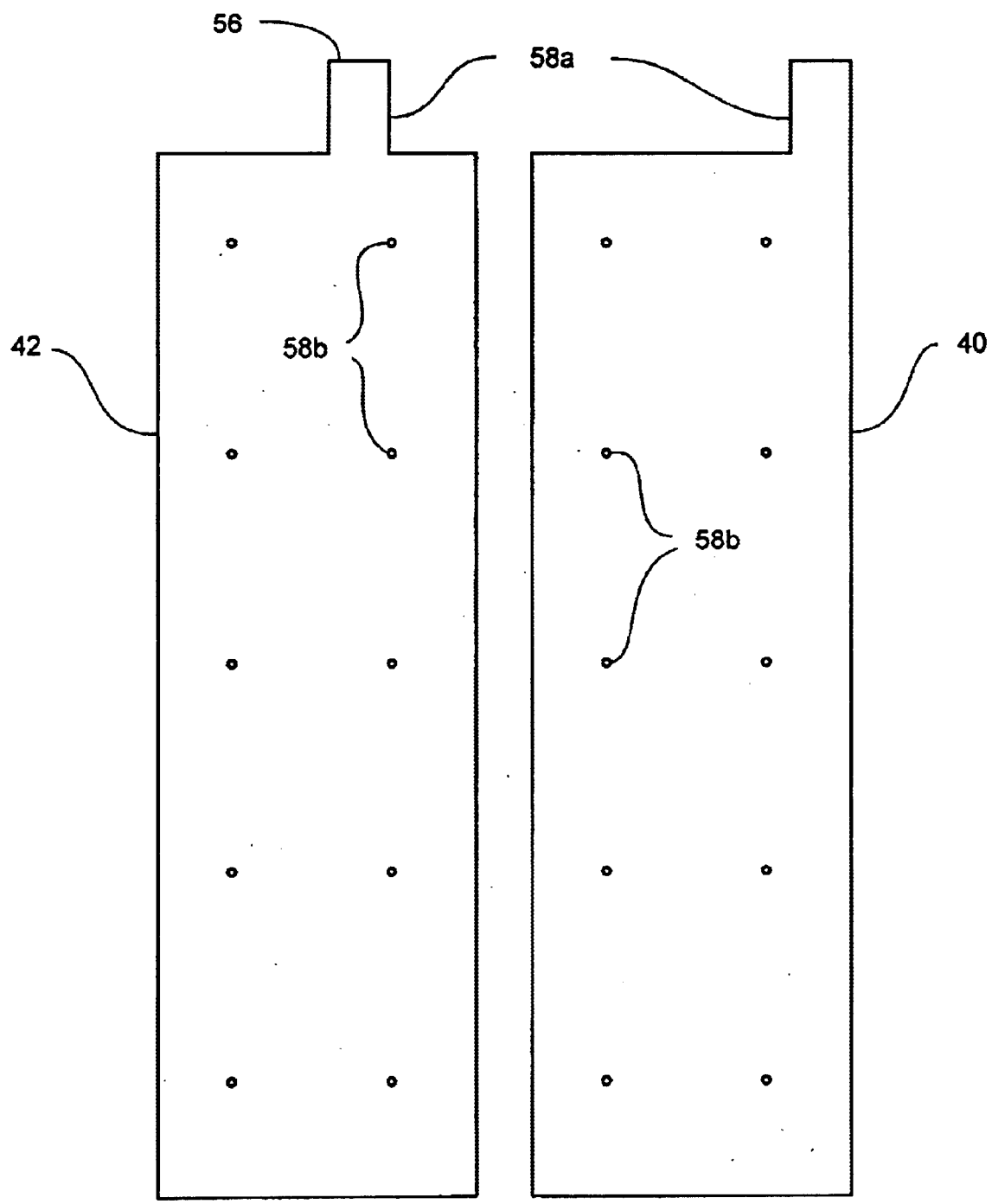
FIG. 2E is a front elevation view of two exemplary electrode plates of an electrode stack in accordance with the chlorination system of FIG. 1.

FIG. 2D further illustrates a three-cell electrode stack 52, better showing from front elevation view the alternating, or staggered, current connector tabs 56 of the present invention. Also shown within FIGS. 2D–2E is a preferred connecting hole pattern for connecting holes 58a within current connector tabs 56; and, a preferred connecting hole pattern for connecting holes 58b within each of electrodes 40, 42. As may be seen, alternating current connector tabs 56 of the present invention, are formed and disposed within each stack 52 so as to maintain appropriate electrical connectivity, while alternating in horizontal placement relative to each other stack 52, similar to conventional paper file folder tabs, in order to obtain a maximized number of electrolytic cells within a chlorinator 26 of any given size.

Figure 2F:
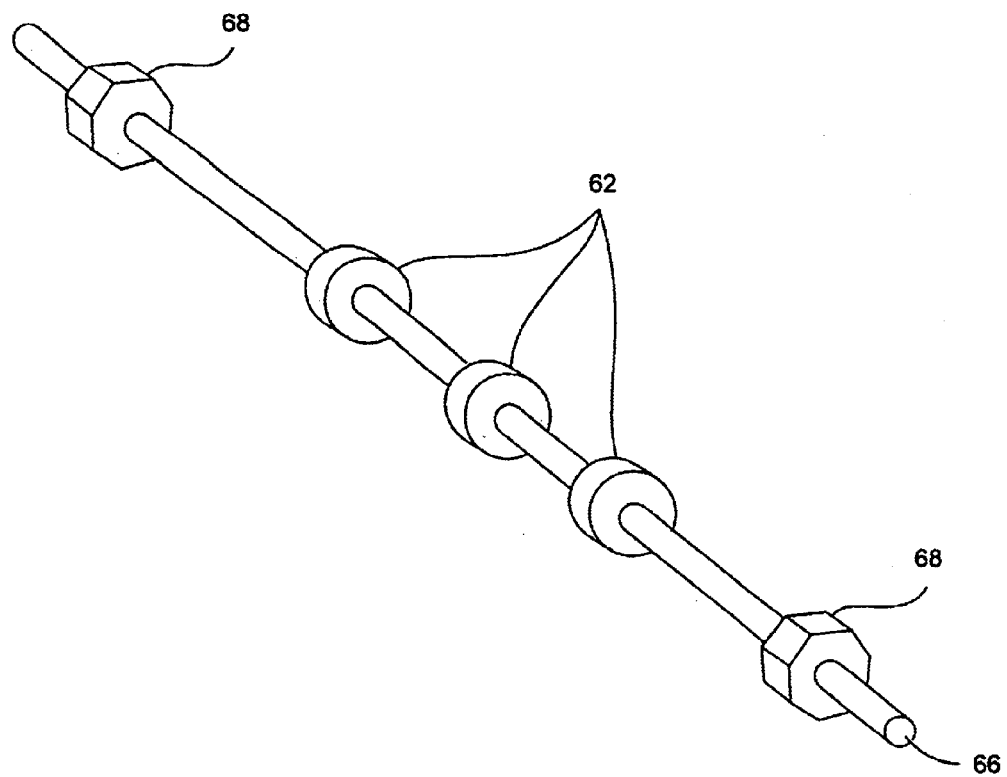
FIG. 2F is a perspective view of the electrode plate connecting elements for an electrode stack in accordance with the chlorination system of FIG. 1.

FIG. 2F illustrates additional details of construction of electrode 40, 42 connecting elements for electrode stack 52 in accordance with the present invention. Shown are titanium threaded rod 66, titanium spacers 62, and titanium nut 68, all for use in association with electrodes 42. It will be recognized that similar construction is made with regard to electrodes 40; however, metallic threaded rod, spacer, and nut components are selected for compatibility of use and operation with electrodes 40. It will be further recognized that similar construction is made with regard to nonconductive components for use in association with connecting holes 58b; however, non-conductive threaded rod, spacer, and nut components are selected for electrical insulation and structural rigidity characteristics of stack 52, all consistent with the criteria hereinabove described.

Figure 2G:
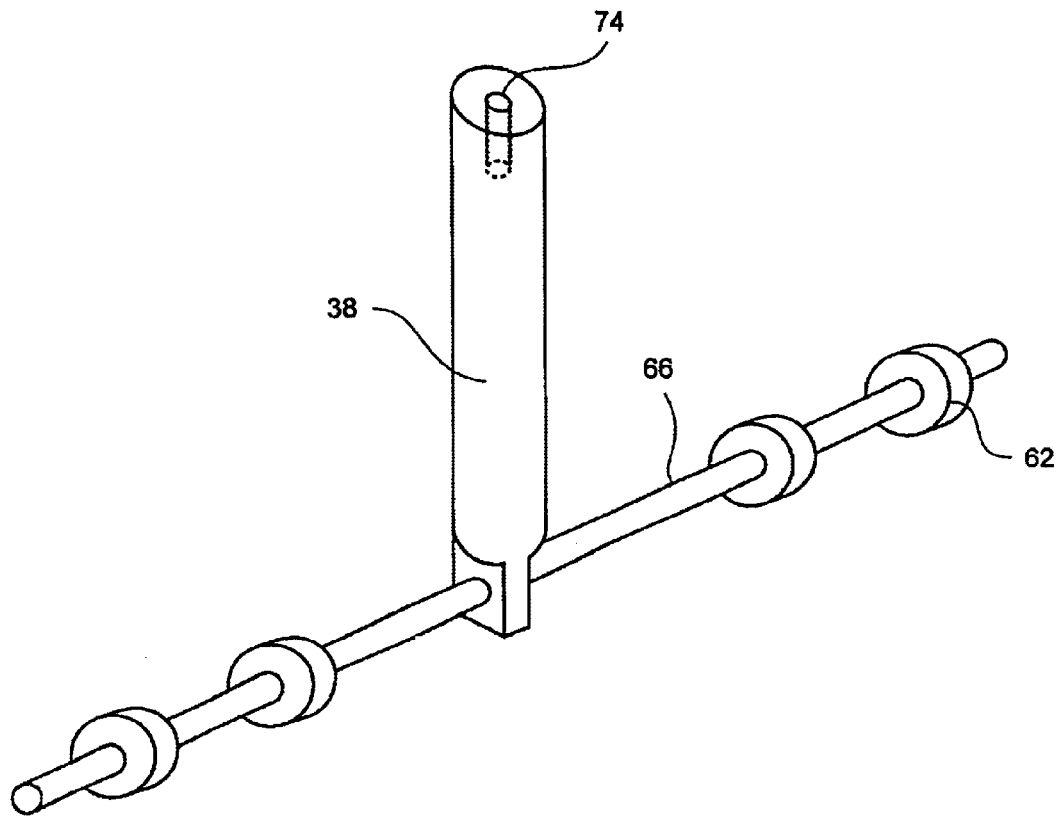
FIG. 2G is a perspective view of a current header connecting rod showing its placement in association with the electrode plate connecting elements for an electrode stack in accordance with the chlorination system of FIG. 1.

In FIG. 2G, current header connecting rod 38 is shown in relative placement in association with connecting elements for electrode 42. Current header connecting rod 38 is mechanically and electrically interconnected with titanium threaded rod 66 at a flattened portion near the bottom thereof, titanium spacers 62, and titanium nuts 68 (not shown in this Figure). Current header connecting rod 38 may further be provided with threaded lughole 74 for attachment of a lug carrying wire 48. Again, it will be recognized that similar construction is made with regard to electrodes 40; however, metallic threaded rod, spacer, and nut components are selected for compatibility of use and operation with electrodes 40.

Figure 2H:
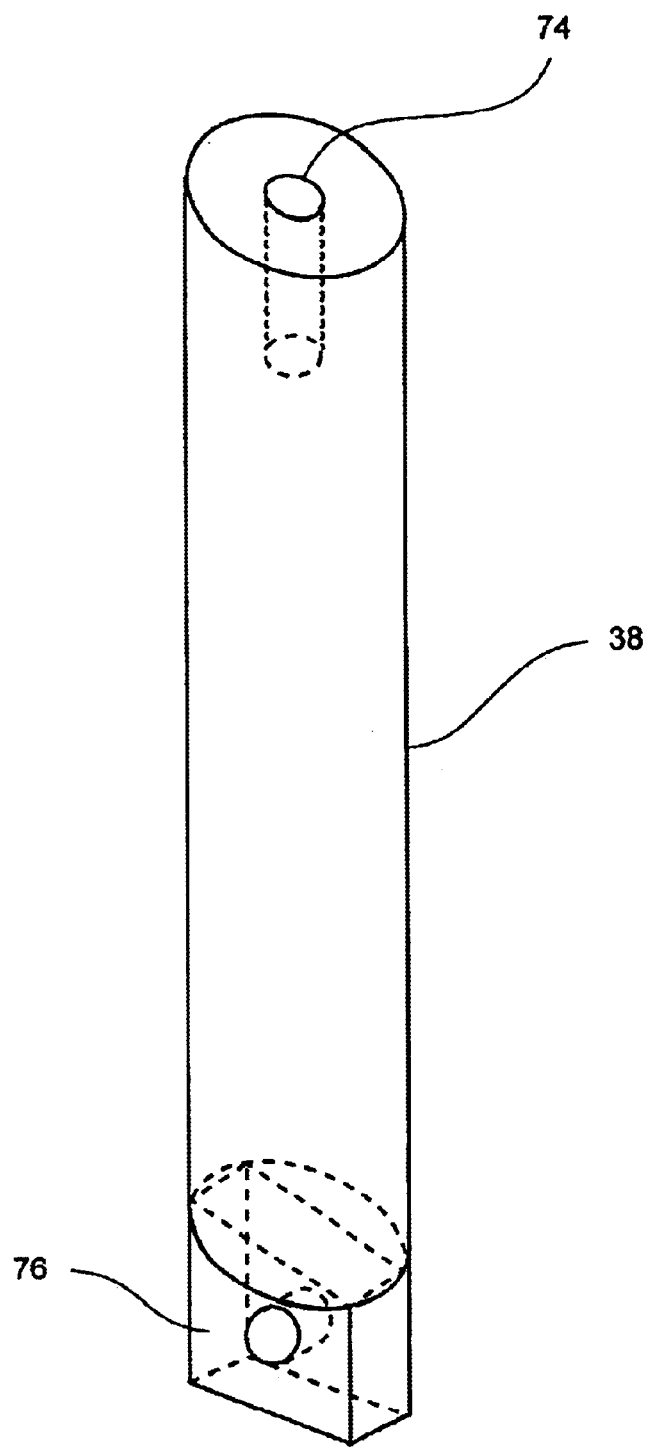
FIG. 2H is a perspective view of a current header connecting rod showing its preferred offset hole arrangement for placement in association with the electrode plate connecting elements for an electrode stack in accordance with the chlorination system of FIG. 1; and, FIG. 3 is a perspective view of an assembled chlorinator in accordance with the chlorination system of FIG. 1 showing the position of a three-cell electrode stack and an exemplary electrical connection between the stacks.

Best seen with reference to FIG. 2H, current header connecting rod 38 carries offset hole 76 within its flattened portion for use in association with threaded rod 66. Offset hole 76 is positioned to one side of a central axis through current header connecting rod 38. Through use of offset hole 76, electrodes 40, 42 are better prevented from touching, and thereby, shorting, and allow for a more compact cell construction within the available space of chlorinator 26 and flanged union 34. It will again be recognized that similar construction may be provided with regard to current header connecting rod 36.

Turning now to FIG. 3, an assembled three-cell chlorinator 26 in accordance with the present invention is illustrated. Best seen with reference to this Figure is the general position of an exemplary three-cell electrode stack 52 within containment housing 32. Sealing containment housing 32 at its lower end is lower containment housing cap 78, preferably formed of PVC material. Lower containment housing cap 78 provides for introduction of water via inlet pipe 28. Flanged union 34 carries current header connecting rods 36, 38.

Electrical link 80a connects, in series, an exemplary first and second cell stack. Electrical link 80b connects, in series, the exemplary second cell stack and an exemplary third cell stack. Accordingly, electrical interconnection of the stacks, in series, is completed. Following exposure within chlorinator 26, treated water is exhausted via return pipe 30.

It will be observed that chlorinator 26 of the present invention, constructed as described herein, allows current header connecting rods 36, 38 to assume a central position at the top of stacks 52; thereby, ensuring even current flow distribution to stacks 52. Such an arrangement minimizes heat build-up at maximum design current flow through connecting rods 36, 38 to electrodes 40, 42. Accordingly, no ancillary cooling means are generally required for chlorinators of the present invention.

Additionally, electrical series connection between stacks reduces the current required for equivalent chlorine production capacity, as compared to a single electrode stack design. Accordingly, smaller, lighter, and more cost-effective cables, transformers, and related ancillary electrical devices may be used in association with the present invention.

Furthermore, the electrode tab configuration of the present invention provides for multiple cell stacks, in electrical series connection, to be accommodated within a single housing, minimizing space requirements and facilitating easy handling and removal of the overall cell stack for maintenance, scheduled cleaning, or the like.

Such features render the present invention more economical, efficient, and safe than other prior art devices. Such features represent a distinct advance over other prior art devices.

Accordingly, and with continuing reference to FIG. 1, pump 12 serves to circulate water from pool 10, through filter 16 and chlorinator 26, and returns the water to pool 10. As the water flows through chlorinator 26, electricity from power supply 44 produces an electrical current between electrodes 40, 42 which causes a chemical reaction in the water, changing the salty water to sodium hypochlorite and releasing free hydrogen, which is absorbed into the atmosphere.

It is noted with regard to the production of free hydrogen gas that the vertical stack arrangement of chlorinator 26 is believed to be significantly safer than many other chlorinators currently available. This is because the vertical arrangement of chlorinator 26 provides, generally, a significantly smaller volume, as compared with horizontal units, within which the hydrogen gas may collect. Additionally, it will be recognized that chlorinator 26 of the present invention may be constructed without valves; thereby, avoiding unsafe compression of any trapped hydrogen gas.

The sodium hypochlorite passes from chlorinator 26 through return pipe 30 and delivery pipe 18 to pool 10, where it serves to prevent growth of algae and to disinfect the water of pool 10. The rate at which the sodium hypochlorite is produced is relatively small, but is continuous. Consequently, the chlorine level in pool 10 remains at a desired level at all times and does not go through the fluctuations previously encountered when the sodium hypochlorite was added in crystalline form. Thus, the chlorine never reaches high levels where it could bleach bathing suits, turn hair green, or cause irritation of eyes and skin.

On the other hand, the chlorine level never falls to such a low level as to allow bacterial growth or algae. Thus, the pool is protected safely and efficiently, without requiring periodic feeding of powdered chlorine and without the dangers and inconveniences that are encountered with the use of powdered chlorine.

Having, thus, described exemplary embodiments of the present invention, it should be noted by those skilled in the art that the within disclosures are exemplary only and that various other alternatives, adaptations, and modifications may be made within the scope and spirit of the present invention. Accordingly, the present invention is not limited to the specific embodiments as illustrated herein, but is only limited by the following claims.

What is claimed is:

1. A chlorinator for a body of water, comprising:

a vertically-oriented electrolytic cell, said electrolytic cell comprising a housing of electrically insulating material and a union disposed at an upper end thereof for closing said housing, said housing further carrying a water inlet adjacent a lower end thereof and a water outlet disposed near said upper end;

a first current header connecting rod penetrating said union and electrically connecting to a first vertically-oriented electrode via a horizontally disposed threaded member penetrating a tab carried by said first electrode, said first electrode for carrying an electrical charge of a first polarity;

a second current header connecting rod penetrating said union and electrically connecting to a second vertically-oriented electrode via a horizontally disposed threaded member penetrating a tab carried by said second electrode, said second electrode for carrying an electrical charge of a second polarity;

said tab carrying an electrical charge of said first polarity being offset from said tab carrying an electrical charge of said second polarity;

said first electrode disposed within said housing adjacent said second electrode, but separated therefrom by an insulated spacer; and, means for supplying electrical power to said electrolytic cell at said first and second current header connecting rods.

2. The chlorinator of claim 1 wherein said first electrode comprises a pair of electrodes interconnected therebetween in electrical parallel arrangement, and wherein said second electrode comprises a pair of electrodes interconnected therebetween in electrical parallel arrangement, each one of said pair of first and second electrodes being interspersed in adjacent alternating arrangement, but electrically separated therebetween by an insulator, the combination comprising an electrode stack.

3. The chlorinator of claim 2 wherein said electrode stack comprises a pair of electrode stacks, each said electrode stack being disposed in adjacent arrangement, but electrically separated therebetween by an insulator, said pair of stacks comprising a pair of electrical cells when electrically interconnected.

4. The chlorinator of claim 1 wherein one of said current header connecting rods further comprises a hole offset from a central vertical axis of said rod, said hole located within a flat depending from said rod.

5. The chlorinator of claim 1 wherein one of said current header connecting rods further comprises a lughole to electrically connect with said power means.

6. The chlorinator of claim 1 wherein one of said horizontally disposed threaded members carries an electrically conductive spacer and nut.

7. The chlorinator of claim 1 wherein said insulated spacer comprises an electrically non-conductive horizontally disposed threaded member, spacer, and nut.

8. The chlorinator of claim 1 wherein said power supply comprises a direct current power supply.

9. The chlorinator of claim 1 wherein said electrolytic cell comprises at least one metallic electrode and at least one precious metal coated electrode.

10. The chlorinator of claim 9 wherein said precious metal coated electrode comprises a titanium substrate.

11. The chlorinator of claim 9 wherein said metallic electrode comprises copper.

12. The chlorinator of claim 9 wherein said precious metal coated electrode is connected to the positive side of said power supply.

13. A chlorination system for a body of water having a pump for circulating said water, said system comprising:

a vertically-oriented electrolytic cell connected between said pump and said water, said electrolytic cell comprising a housing of electrically insulating material and a union disposed at an upper end thereof for closing said housing, said housing further carrying a water inlet adjacent a lower end thereof and a water outlet disposed near said upper end;

a first current header connecting rod penetrating said union and electrically connecting to a first vertically-oriented electrode via a horizontally disposed threaded member penetrating a tab carried by said first electrode, said first electrode for carrying an electrical charge of a first polarity;

a second current header connecting rod penetrating said union and electrically connecting to a second vertically-oriented electrode via a horizontally disposed threaded member penetrating a tab carried by said second electrode, said second electrode for carrying an electrical charge of a second polarity;

said tab carrying an electrical charge of said first polarity being offset from said tab carrying an electrical charge of said second polarity;

said first electrode disposed within said housing adjacent said second electrode, but separated therefrom by an insulated spacer;

a direct current electrical power supply for energizing said electrolytic cell at said first and second current header connecting rods; and, means for maintaining a desired saline solution in the water to be protected.

14. The system of claim 13 wherein said electrolytic cell comprises a copper electrode and a precious metal coated titanium electrode.

15. The system of claim 13 wherein said means for maintaining a desired saline solution in the water to be protected serves to maintain said water at a salinity of about 0.7%.

16. The system of claim 13 wherein said means for maintaining a desired saline solution in the water to be protected is selected from the group consisting of: a porous float, a dispenser, a feeder mechanism, or manual addition.

17. The system of claim 13 wherein said body of water is selected from the group consisting of: a swimming pool, a spa, or a potable water supply.

18. The system of claim 13 wherein said first electrode comprises a pair of electrodes interconnected therebetween in electrical parallel arrangement, and wherein said second electrode comprises a pair of electrodes interconnected therebetween in electrical parallel arrangement, each one of said pair of first and second electrodes being interspersed in adjacent alternating arrangement, but electrically separated therebetween by an insulator, the combination comprising an electrode stack.

19. The system of claim 18 wherein said electrode stack comprises a pair of electrode stacks, each said electrode stack being disposed in adjacent arrangement, but electrically separated therebetween by an insulator, said pair of stacks comprising a pair of electrical cells when electrically interconnected.

20. A chlorinator for a body of water, comprising:

a pair of vertically-oriented electrolytic cells, said electrolytic cells carried by a common housing of electrically insulating material and a union disposed at an upper end thereof for closing said housing, said housing further carrying a water inlet adjacent a lower end thereof and a water outlet disposed near said upper end;

each said cell comprising a first metallic current header connecting rod penetrating said union and electrically connecting to a first vertically-oriented electrode via a horizontally disposed threaded member penetrating a tab carried by said first electrode, said first electrode for carrying an electrical charge of a first polarity; a second metallic current header connecting rod penetrating said union and electrically connecting to a second vertically-oriented electrode via a horizontally disposed threaded member penetrating a tab carried by said second electrode, said second electrode for carrying an electrical charge of a second polarity; said tab carrying an electrical charge of said first polarity being offset from said tab carrying an electrical charge of said second polarity; said first electrode disposed adjacent said second electrode, but separated therefrom by an insulated spacer;

said cells disposed adjacent one another within said housing, but electrically separated therebetween by an insulator, said cells being interconnected in electrical series arrangement via said current header connecting rods; and, a direct current power supply to energize said electrolytic cells.

* * * * *